United States Patent
Eberhard et al.

(10) Patent No.: US 10,331,523 B2
(45) Date of Patent: Jun. 25, 2019

(54) RECOVERING A FAILED CLUSTERED SYSTEM USING CONFIGURATION DATA FRAGMENTS

(71) Applicant: International Business Machines Corporation, Armonk, NY (US)

(72) Inventors: Ralf Eberhard, Mainz (DE); Manfred Haubrich, Gensingen (DE); Simon Lorenz, Geisenheim (DE); Frank B. Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 15/479,075

(22) Filed: Apr. 4, 2017

(65) Prior Publication Data
US 2018/0285211 A1    Oct. 4, 2018

(51) Int. Cl.
*G06F 11/14* (2006.01)

(52) U.S. Cl.
CPC ...... *G06F 11/1451* (2013.01); *G06F 11/1469* (2013.01)

(58) Field of Classification Search
CPC ............. G06F 11/1435; G06F 11/1448; G06F 11/1451; G06F 11/1469; G06F 11/1471
USPC .............................................. 714/15, 20, 21
See application file for complete search history.

(56) References Cited

U.S. PATENT DOCUMENTS

| | | | |
|---|---|---|---|
| 6,487,678 B1 | 11/2002 | Briskey et al. | |
| 6,938,084 B2 | 8/2005 | Gamache et al. | |
| 6,990,606 B2 | 1/2006 | Schroiff et al. | |
| 7,409,414 B2* | 8/2008 | Okada | G06F 11/1471 707/648 |
| 7,496,783 B1 | 2/2009 | Graf et al. | |
| 7,644,300 B1* | 1/2010 | Rao | G06F 11/1435 714/15 |
| 8,145,936 B2 | 3/2012 | Seelig et al. | |
| 8,856,593 B2 | 10/2014 | Eckhardt et al. | |
| 8,935,431 B2 | 1/2015 | Oehme et al. | |
| 9,087,012 B1 | 7/2015 | Hayes et al. | |
| 9,135,018 B2 | 9/2015 | Britsch et al. | |
| 2002/0163760 A1* | 11/2002 | Lindsey | G06F 3/0617 360/134 |
| 2009/0222812 A1 | 9/2009 | Nissen et al. | |
| 2012/0036106 A1* | 2/2012 | Desai | G06F 11/2094 707/645 |
| 2015/0378839 A1* | 12/2015 | Langouev | G06F 11/1464 714/19 |
| 2017/0193031 A1* | 7/2017 | Papapanagiotou | G06F 11/1451 |

OTHER PUBLICATIONS

Rao et al., "Using Paxos to Build a Scalable, Consistent, and Highly Available Datastore," Proceedings of the VLDB Endowment, vol. 4, No. 4, 2011, pp. 243-254.
Eberhard et al., U.S. Appl. No. 16/379,677, dated Apr. 9, 2019.

* cited by examiner

*Primary Examiner* — Joseph R Kudirka
(74) *Attorney, Agent, or Firm* — Zilka-Kotab, P.C.

(57) ABSTRACT

A computer-implemented method according to one embodiment includes identifying one or more accessible server nodes within a plurality of nodes of a failed clustered system, retrieving a plurality of fragments of configuration data from the one or more accessible server nodes, and constructing a backup state for the failed clustered system, utilizing the plurality of fragments of the configuration data.

19 Claims, 9 Drawing Sheets

RECOVERING A FAILED CLUSTERED SYSTEM USING CONFIGURATION DATA FRAGMENTS

BACKGROUND

The present invention relates to clustered systems, and more specifically, this invention relates to recovering a clustered system that has failed.

Clustered systems (e.g., utilizing one or more computer clusters, etc.) are a popular implementation that addresses modern computing needs. In order to be fault tolerant, nodes must use the same state as all other nodes within the clustered system, and the nodes may be updated once the state changes. However, current implementations of clustered systems lack robust fault tolerance, and recovery of a failed clustered system may not be possible if the number of failures exceeds the number that the system was designed to handle.

SUMMARY

A computer-implemented method according to one embodiment includes identifying one or more accessible server nodes within a plurality of nodes of a failed clustered system, retrieving a plurality of fragments of configuration data from the one or more accessible server nodes, and constructing a backup state for the failed clustered system, utilizing the plurality of fragments of the configuration data.

According to another embodiment, a computer program product for recovering a failed clustered system comprises a computer readable storage medium having program instructions embodied therewith, wherein the computer readable storage medium is not a transitory signal per se, and where the program instructions are executable by a processor to cause the processor to perform a method comprising identifying one or more accessible server nodes within a plurality of nodes of a failed clustered system, utilizing the processor, retrieving a plurality of fragments of configuration data from the one or more accessible server nodes, utilizing the processor, and constructing, utilizing the processor, a backup state for the failed clustered system, utilizing the plurality of fragments of the configuration data.

A system according to another embodiment includes a processor, and logic integrated with the processor, executable by the processor, or integrated with and executable by the processor, the logic being configured to identify one or more accessible server nodes within a plurality of nodes of a failed clustered system, retrieve a plurality of fragments of configuration data from the one or more accessible server nodes, and construct a backup state for the failed clustered system, utilizing the plurality of fragments of the configuration data.

Other aspects and embodiments of the present invention will become apparent from the following detailed description, which, when taken in conjunction with the drawings, illustrate by way of example the principles of the invention.

DETAILED DESCRIPTION

Figure 1:
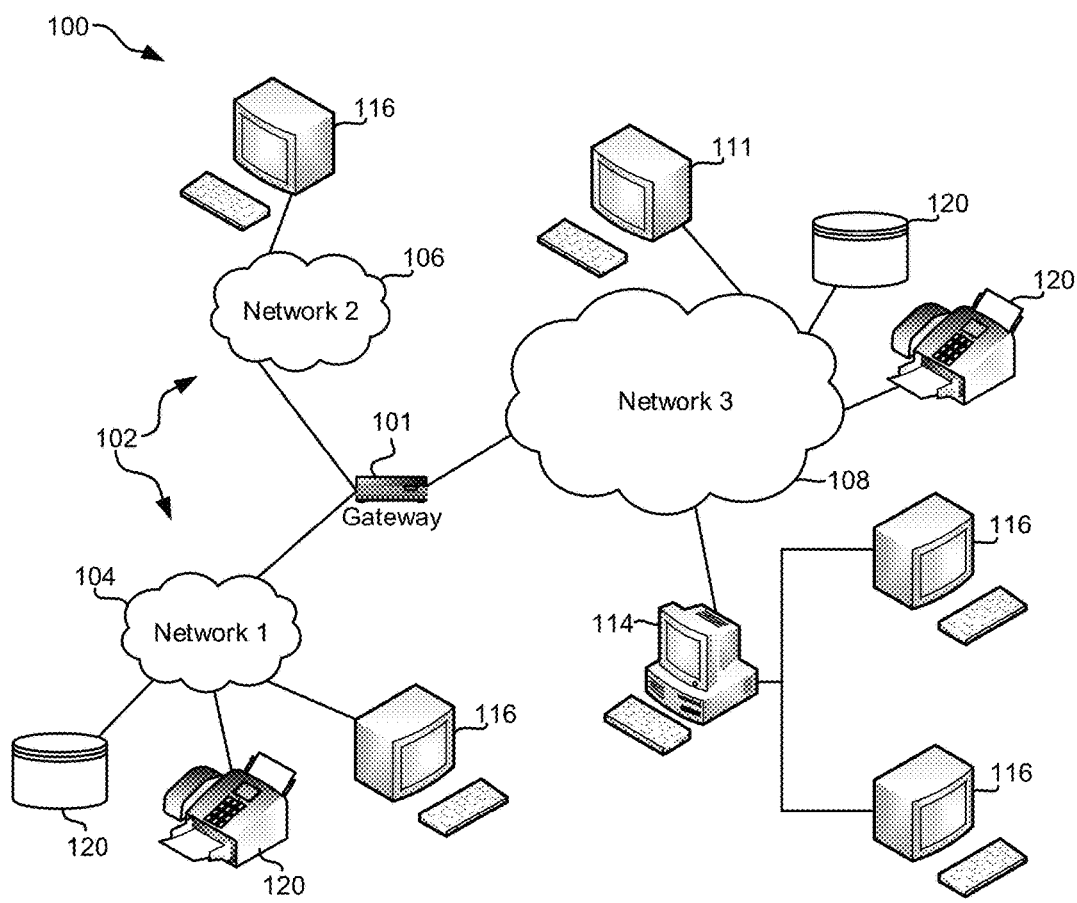
FIG. 1 illustrates a network architecture, in accordance with one embodiment.

The following description discloses several preferred embodiments of systems, methods and computer program products for recovering a failed clustered system using configuration data fragments. Various embodiments provide a method to gather fragments of configuration data from various nodes within a failed cluster, and use that data to create a backup state to recover the failed cluster.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for recovering a failed clustered system.

In one general embodiment, a computer-implemented method includes identifying one or more accessible server nodes within a plurality of nodes of a failed clustered system, retrieving a plurality of fragments of configuration data from the one or more accessible server nodes, and constructing a backup state for the failed clustered system, utilizing the plurality of fragments of the configuration data.

In another general embodiment, a computer program product for recovering a failed clustered system comprises a computer readable storage medium having program instructions embodied therewith, wherein the computer readable storage medium is not a transitory signal per se, and where the program instructions are executable by a processor to cause the processor to perform a method comprising identifying one or more accessible server nodes within a plurality of nodes of a failed clustered system, utilizing the processor, retrieving a plurality of fragments of configuration data from the one or more accessible server nodes, utilizing the processor, and constructing, utilizing the processor, a backup state for the failed clustered system, utilizing the plurality of fragments of the configuration data.

In another general embodiment, a system includes a processor, and logic integrated with the processor, executable by the processor, or integrated with and executable by the processor, the logic being configured to identify one or more accessible server nodes within a plurality of nodes of a failed clustered system, retrieve a plurality of fragments of configuration data from the one or more accessible server nodes, and construct a backup state for the failed clustered system, utilizing the plurality of fragments of the configuration data.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
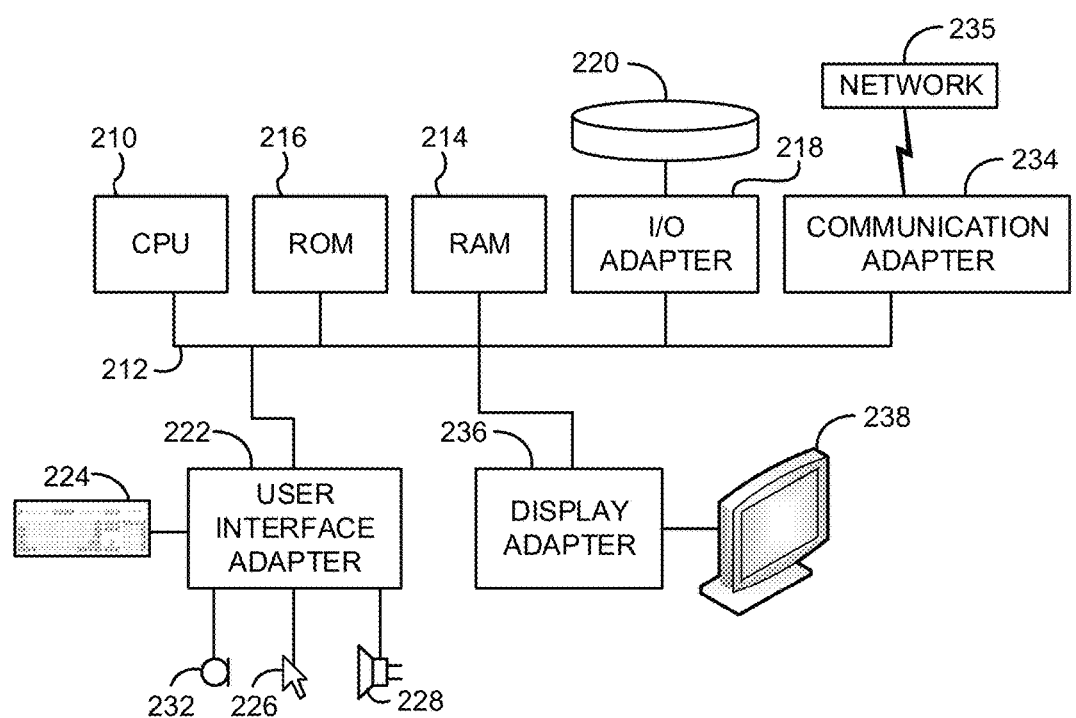
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
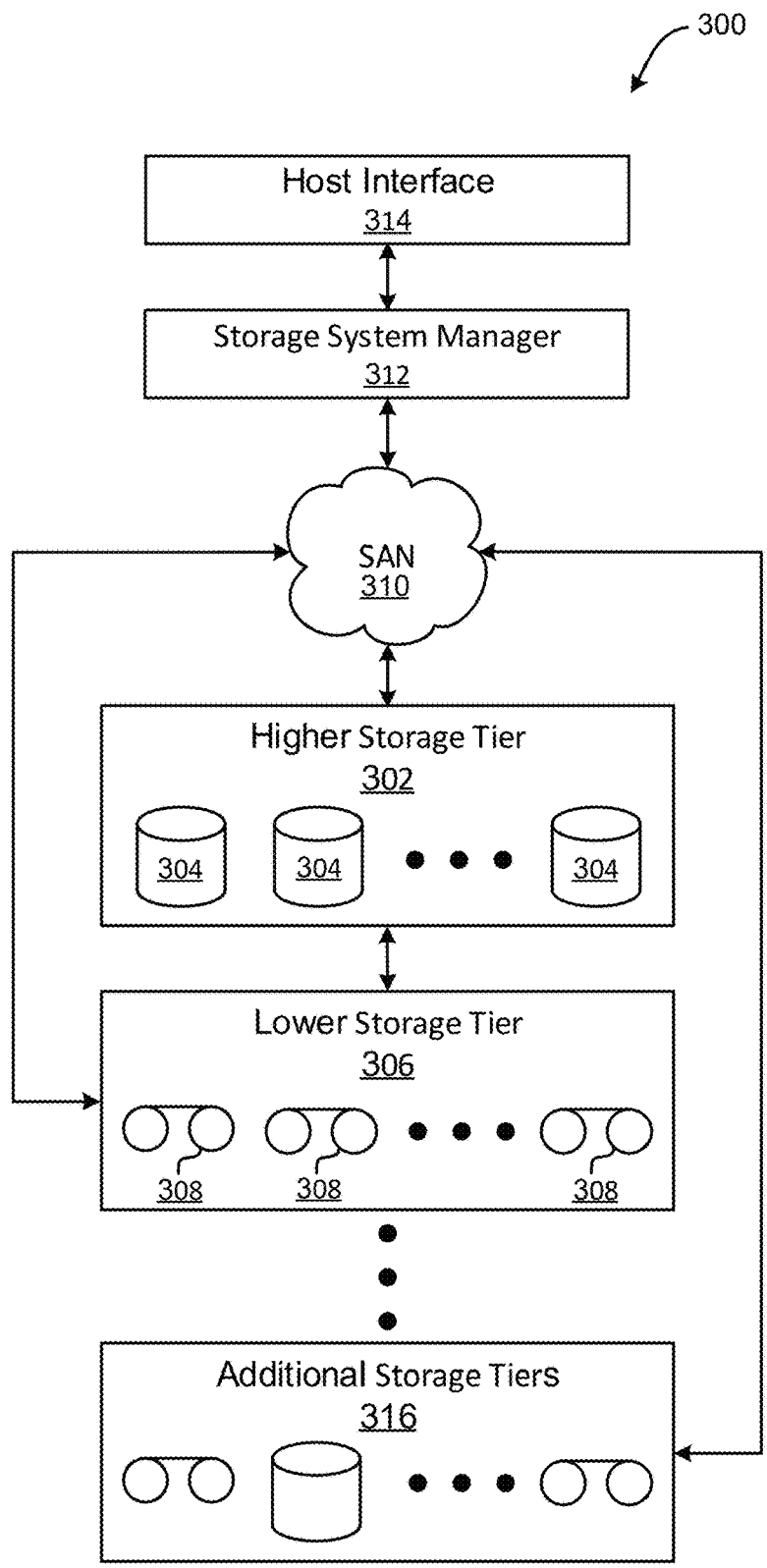
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
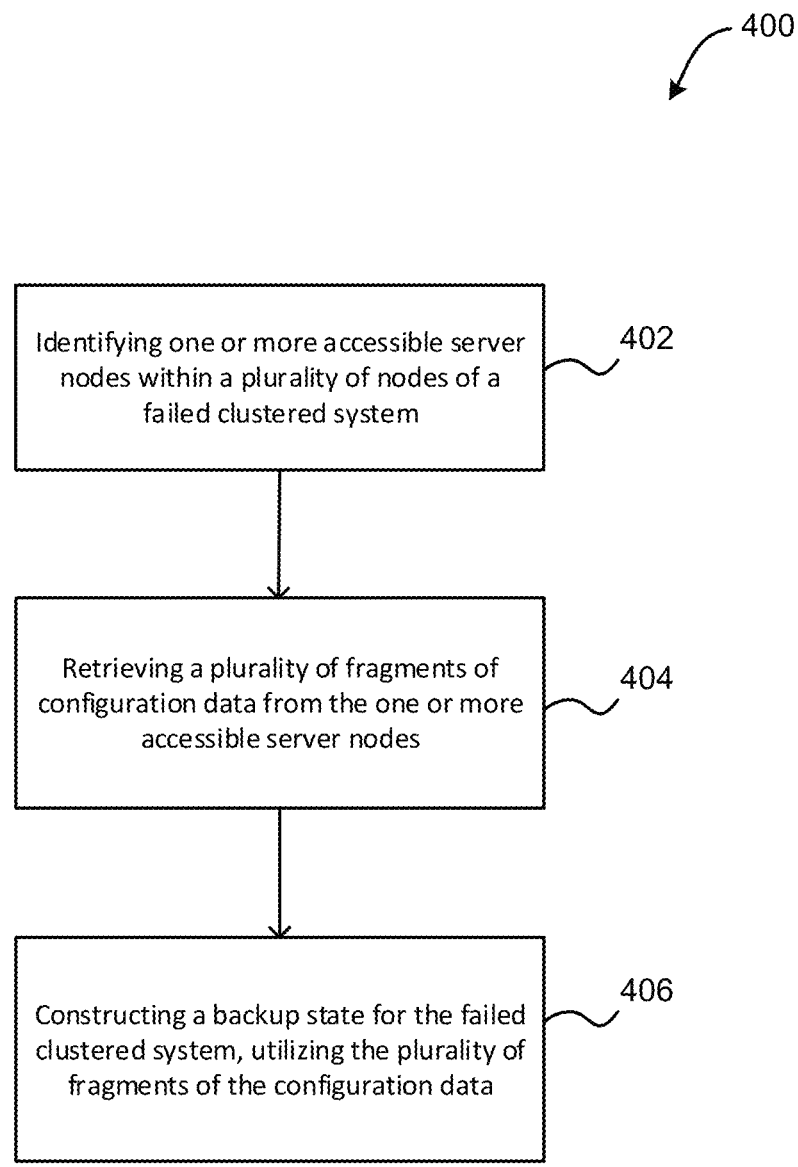
FIG. 4 illustrates a method for recovering a failed clustered system using configuration data fragments, in accordance with one embodiment.

Now referring to FIG. 4, a flowchart of a method 400 is shown according to one embodiment. The method 400 may be performed in accordance with the present invention in any of the environments depicted in FIGS. 1-3 and 7-9, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where one or more accessible server nodes are identified within a plurality of nodes of a failed clustered system. In one embodiment, the clustered system may include a set of computing devices working together as a single system. For example, each of the plurality of nodes may include a computing device (e.g., a server computer, mobile computer, desktop computer, etc.). In another embodiment, each of the plurality of nodes may have a designated role, function, etc. For example, each of the plurality of nodes may perform the same task, and may be controlled by one or more software applications.

Additionally, in one embodiment, the failed clustered system may include a clustered system in which one or more nodes have failed. For example, a failure of a node of the clustered system may be detected by identifying a corruption of a file system of a node, a corruption of one or more individual files within the node, a physical hardware failure of the node, etc. In another embodiment, a failure of the clustered system may be detected when the number of failures exceeds the number that the system was designed to handle is determined. This state is called "cluster failure" in this document. For example, a loss of a predetermined number of the plurality of nodes due to inaccessibility or corruption may be determined.

Further, in one embodiment, a predetermined portion of the plurality of nodes may include server nodes. In another embodiment, before a failure of the clustered system, the server nodes may contain configuration data that is replicated across each of the server nodes. For example, before the failure of the clustered system, each of the server nodes may have an identical replica of a single configuration state. In yet another embodiment, a loss of a predetermined portion of these server nodes (e.g., a loss of a majority of the server nodes) may result in a cluster failure.

Further still, in one embodiment, the failed clustered system may be detected by monitoring the plurality of nodes within the clustered system (e.g., by a requestor node of the system, etc.). In another embodiment, the failed clustered system may be detected by receiving a notification from another system, module, etc. (e.g., at the requestor node, etc.). In yet another embodiment, accessible server nodes may include server nodes that are not completely corrupted or inaccessible. For example, accessible server nodes may include server nodes that are able to send and receive data (e.g., to the requestor node, etc.).

Further, as shown in FIG. 4, method 400 may proceed with operation 404, where a plurality of fragments of configuration data are retrieved from the one or more accessible server nodes. In one embodiment, one or more accessible nodes may be identified, and for each of the one or more accessible nodes, it may be determined whether the accessible node is a server node. In another embodiment, for each of the one or more accessible nodes, configuration data may be requested from the accessible node, upon determining that the accessible node is a server node. In yet another embodiment, one or more of the plurality of fragments of the configuration data may then be received from each of the one or more accessible server nodes, in response to the request.

In addition, in one embodiment, the configuration data may include a plurality of configuration files. For example, the configuration data may include state information (e.g., information describing a state of the clustered system, etc.). In another example, the configuration data may include one or more of key-value pairs, internal data, a file list, and configuration files. In yet another example, the configuration data may include a list of all server nodes within the plurality of nodes. In still another example, the configuration data may include metadata describing each file stored within the node. For instance, the metadata may include one or more of a file ID, an update ID, a version number, a cyclic redundancy check (CRC), etc. In another embodiment, the state information may include an update sequence number that is incremented after each update.

Also, in one embodiment, the fragments of the configuration data may include a portion (e.g., a subset, etc.) of the plurality of configuration files. In another embodiment, the plurality of fragments of configuration data may be retrieved by a requestor node of the system.

Further still, as shown in FIG. 4, method 400 may proceed with operation 406, where a backup state is constructed for the failed clustered system, utilizing the plurality of fragments of the configuration data. In one embodiment, the backup state may include a set of the configuration data that is reconstructed utilizing the plurality of fragments of the configuration data. In another embodiment, constructing the backup state may include merging the plurality of fragments of the configuration data to form the backup state.

Further still, in one embodiment, constructing the backup state may include determining that one or more of the fragments of the configuration data are out of sync (e.g., are associated with states having different sequence numbers). In another embodiment, constructing the backup state may include using configuration data associated with a state having the highest sequence number of the different sequence numbers, in response to the determining.

Also, in one embodiment, constructing the backup state may include identifying a file list associated with a state having the highest sequence number of all sequence numbers within the accessible server nodes. In another embodiment, the file list may be compared to all files within the plurality of fragments of configuration data retrieved from the one or more accessible server nodes. In yet another embodiment, a file entry within the file list may be deleted upon determining that an intact copy of the file associated with the file entry is not included within the plurality of fragments. In still another embodiment, version numbers of each file entry within the file list may be updated to refer to the most recent versions of all files included within the plurality of fragments of configuration data.

Additionally, in one embodiment, the failed clustered system may be restored, utilizing the backup state. For example, the backup state may be sent to each of the plurality of nodes of the clustered system. In another example, the backup state may be used by each of the plurality of nodes to restore the node. In yet another example, restoring the node may include replacing the current state of the node with the backup state (e.g., by removing the current state of the node and storing the backup state at the node, etc.). In another embodiment, the backup state may be constructed by the requestor node of the system.

In this way, a workable state may be automatically reconstructed and used as a basis to recover the clustered system that has failed by gathering intact fragments from accessible server nodes. More specifically, after restoration, each of the server nodes may store an identical replica of the backup state.

Figure 5:
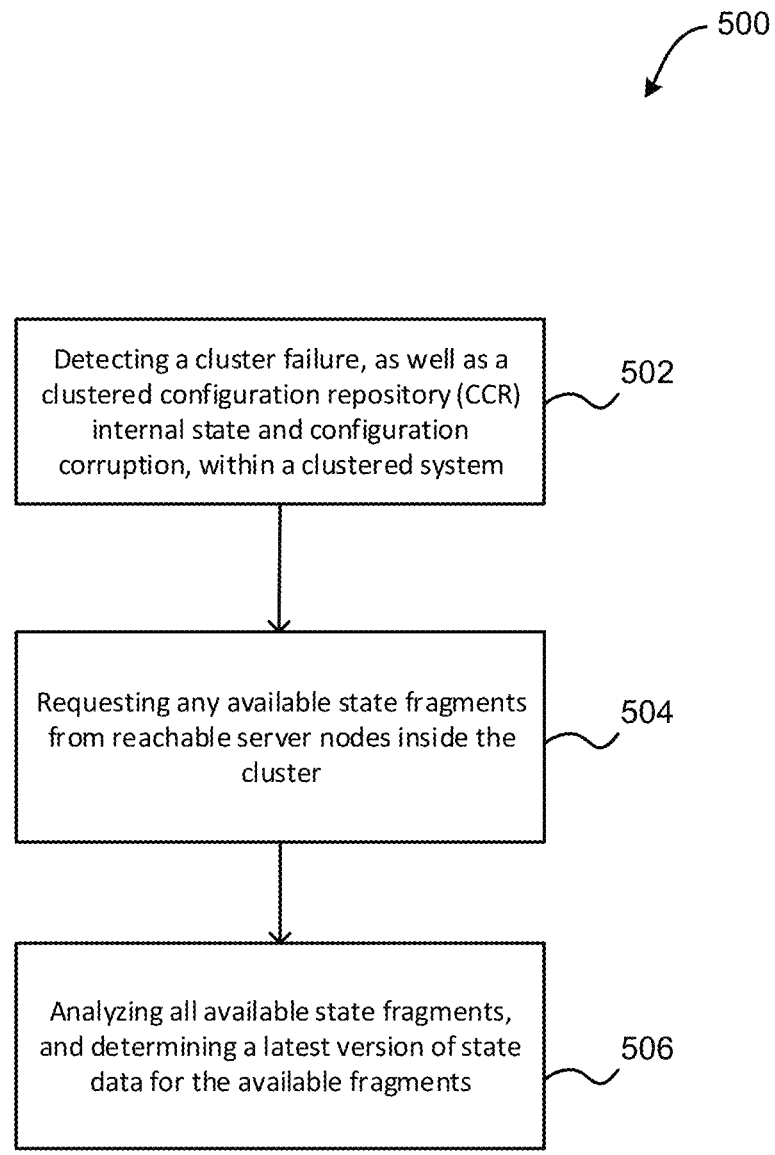
FIG. 5 illustrates a method for requesting and analyzing state fragments from a failed clustered system, in accordance with one embodiment.

Now referring to FIG. 5, a flowchart of a method 500 for requesting and analyzing state fragments from a failed clustered system is shown according to one embodiment. The method 500 may be performed in accordance with the present invention in any of the environments depicted in FIGS. 1-3 and 7-9, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a cluster failure, as well as a clustered configuration repository (CCR) internal state and configuration corruption, is detected within a clustered system. In one embodiment, the CCR may include a distributed database within a general parallel file system (GPFS) that has the responsibility to maintain configuration data replicated across a designated set of nodes called server nodes. The configuration data maintained by the CCR may include a set of key-value pairs and a collection of configuration files. These files may include configuration files or state information committed to the CCR by other components (e.g., a network file system (NFS), GPFS internal, etc.).

Additionally, in one embodiment, the CCR may use a consensus based method, such as a Paxos based method, to distribute updates to the state information to all server nodes and to keep replicas of the state consistent. Internally, the CCR may store the configuration data it maintains as a set of committed files corresponding to the configuration files committed to the CCR and a Paxos state file containing key-value pairs as well as CCR internal data. The Paxos state file may include data needed to run the Paxos algorithm, CCR configuration in terms of the short node list, containing all server nodes, and a file list containing metadata about files committed to the CCR (e.g., file ID, update ID, version number, CRC of each file, etc.).

Further, in one embodiment, the CCR may be working normally as long as valid CCR state replicas are available from a majority of server nodes. When a majority of CCR state replicas have become inaccessible or corrupted (e.g. via one or more of a corrupted file system, individual file corruption, hardware failures of a server node, etc.), the CCR may no longer function, and GPFS, which may depend on the CCR, may not be able to work properly. This scenario may be called cluster failure.

Additionally, method 500 may proceed with operation 504, where any available state fragments are requested from reachable server nodes inside the cluster. In one embodiment, upon determining that the CCR state on at least one server node is accessible, a workable CCR state may be constructed from the at least one server node that may be used as a basis to recover the broken system. This workable CCR state may be constructed by gathering intact CCR state fragments from the still reachable server nodes.

In order to perform this, the CCR may look at the first still reachable server node, and may ask the CCR server on the node for still intact state fragments. Upon determining that the first node has only some of the CCR owned configuration files and a Paxos state file, those files may be transferred to the CCR requester node for further handling. Next, the CCR requester node may ask each of the other still reachable server nodes for intact state fragments. These server nodes may also respond with the intact Paxos state information on the node, if available, as well as any intact committed files. These fragments may be transferred to the CCR requester node.

Further, method 500 may proceed with operation 506, where all available state fragments are analyzed, and a latest version of state data is determined for the available fragments. In one embodiment, the latest version of the state data may include an identification of the most recent version of state fragments made available to the server nodes. For example, periodic state data updates may be made available to the server nodes, where the data in such updates is associated with a version number. An analysis of the state data within the available fragments may include identifying, for the state data within the fragments, version numbers associated with the state data, and determining the most recent version number from the identified version numbers. This most recent version number may be used to identify the most recent version of the state data stored within the server nodes that is included within the available fragments.

Figure 6:
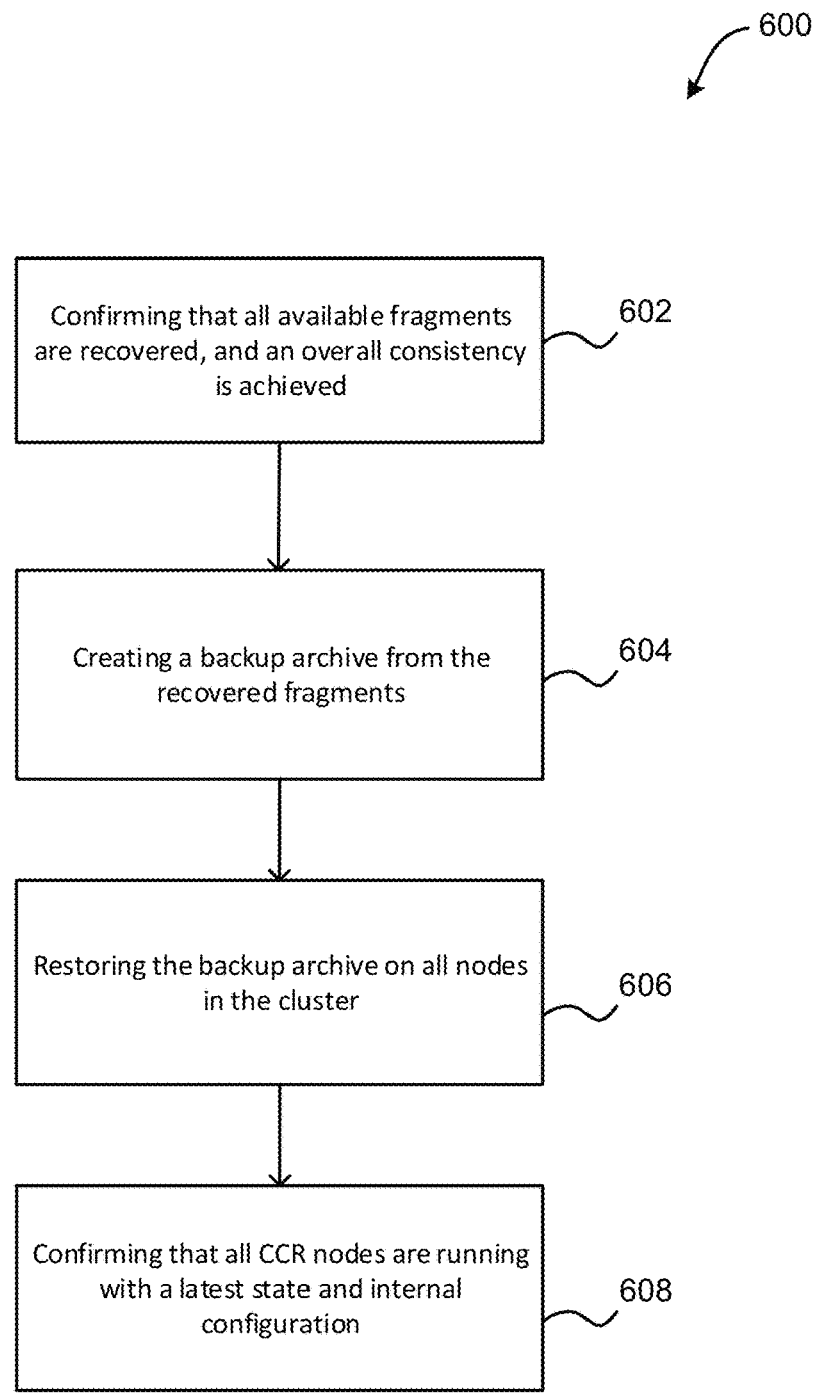
FIG. 6 illustrates a method for creating and implementing a backup archive, in accordance with one embodiment.

Now referring to FIG. 6, a flowchart of a method 600 for creating and implementing a backup archive is shown according to one embodiment. The method 600 may be performed in accordance with the present invention in any of the environments depicted in FIGS. 1-3 and 7-9, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where it is confirmed that all available fragments are recovered, and an overall consistency is achieved. In one embodiment, the overall consistency may include a consistency of all configuration data retrieved from the available fragments. In another embodiment, the overall consistency may be achieved by adjusting one or more fragments. In yet another embodiment, the overall consistency may be achieved by recovering a fragment, utilizing one or more other fragments.

In one embodiment, all fragments received by a CCR requester may be merged to a single state file (e.g., a state-of-art archive, etc.). During this merge the one or more scenarios may occur. For example, the CCR owned configuration files received from the server nodes may be out of sync, and/or the CCR owned Paxos state information received from the server nodes may be out of sync, in which case the last known Paxos state information may be used based on the highest sequence number in the Paxos state information.

In another example, not all committed files may be available, based on the latest known Paxos state information, and/or only a previous version of a committed file may be available, in which case the Paxos state information may be patched to construct a consistent overall state. In one embodiment, the file list in the selected Paxos state may be compared against committed files collected from the server nodes and, if necessary, the Paxos state may be patched.

In another embodiment, patching the Paxos state information may include deleting a file list entry of one of the files in the file list if no intact copy has been found in the gathering phase. In yet another embodiment, patching the Paxos state information may include replacing a file list entry of one of the files in the file list with an entry referring to a most recent version of a file that is found in the recovered fragments, if no intact committed file with a matching version number has been found in the gathering phase for the file.

Additionally, method 600 may proceed with operation 604, where a backup archive is created from the recovered fragments. Further, method 600 may proceed with operation 606, where the backup archive is restored on all nodes in the cluster. For example, after the merge cycle, the generated CCR state (e.g. the mentioned archive file containing the entire CCR state) may be used to recover the broken server nodes by wiping out the still existing (but broken) CCR state on each server node and telling the CCR server on the server node the new CCR state based on the new generated CCR state.

Further, method 600 may proceed with operation 608, where all CCR nodes are confirmed to be running with a latest state and internal configuration.

Figure 7:
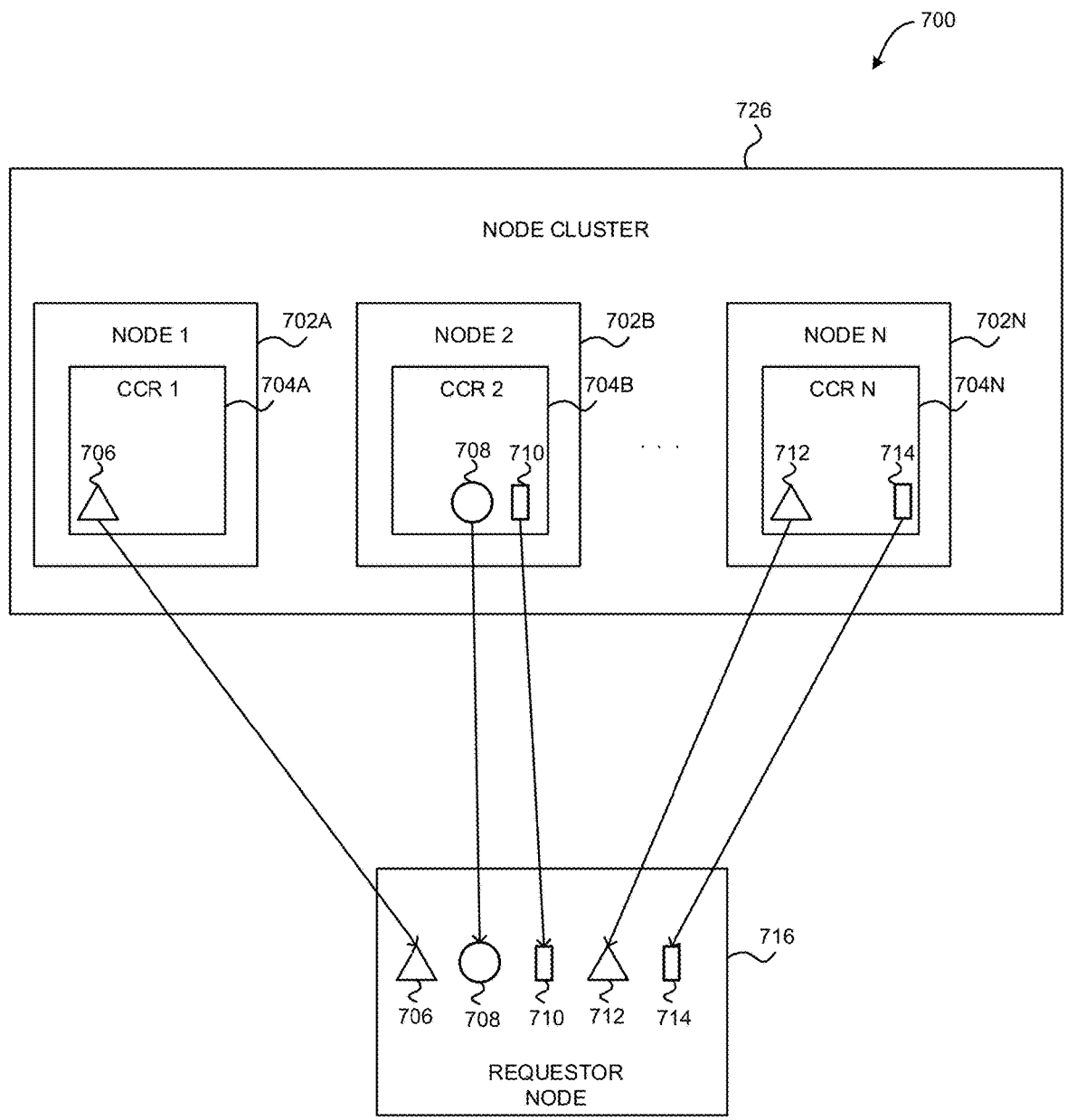
FIG. 7 illustrates an exemplary retrieval of state fragments from a plurality of server nodes by a requestor node, in accordance with one embodiment.

FIG. 7 illustrates an exemplary retrieval 700 of state fragments 706-714 from a plurality of server nodes 702A-N of a node cluster 726 by a requestor node 716, according to one embodiment. The node cluster 726 includes a plurality of server nodes 702A-N, where each of the plurality of server nodes 702A-N has a respective CCR 704A-N. As shown, each of the CCRs 704A-N are missing a complete set of state data, and are therefore corrupted. More specifically, the first CCR 704A of the first server node 702A only has a first copy 706 of a first state fragment, the second CCR 704B of the second server node 702B only has a second state fragment 708 and a first portion 710 of a third state fragment, and the Nth CCR 704N of the Nth server node 702N only has a second copy 712 of the first state fragment and a second portion 714 of the third state fragment.

In one embodiment, the plurality of server nodes 702A-N may constitute a majority of the server nodes. In this way, since the plurality of server nodes 702A-N have corrupted CCRs 704A-N, a loss of the majority of the server nodes may be determined to exist.

Figure 8:
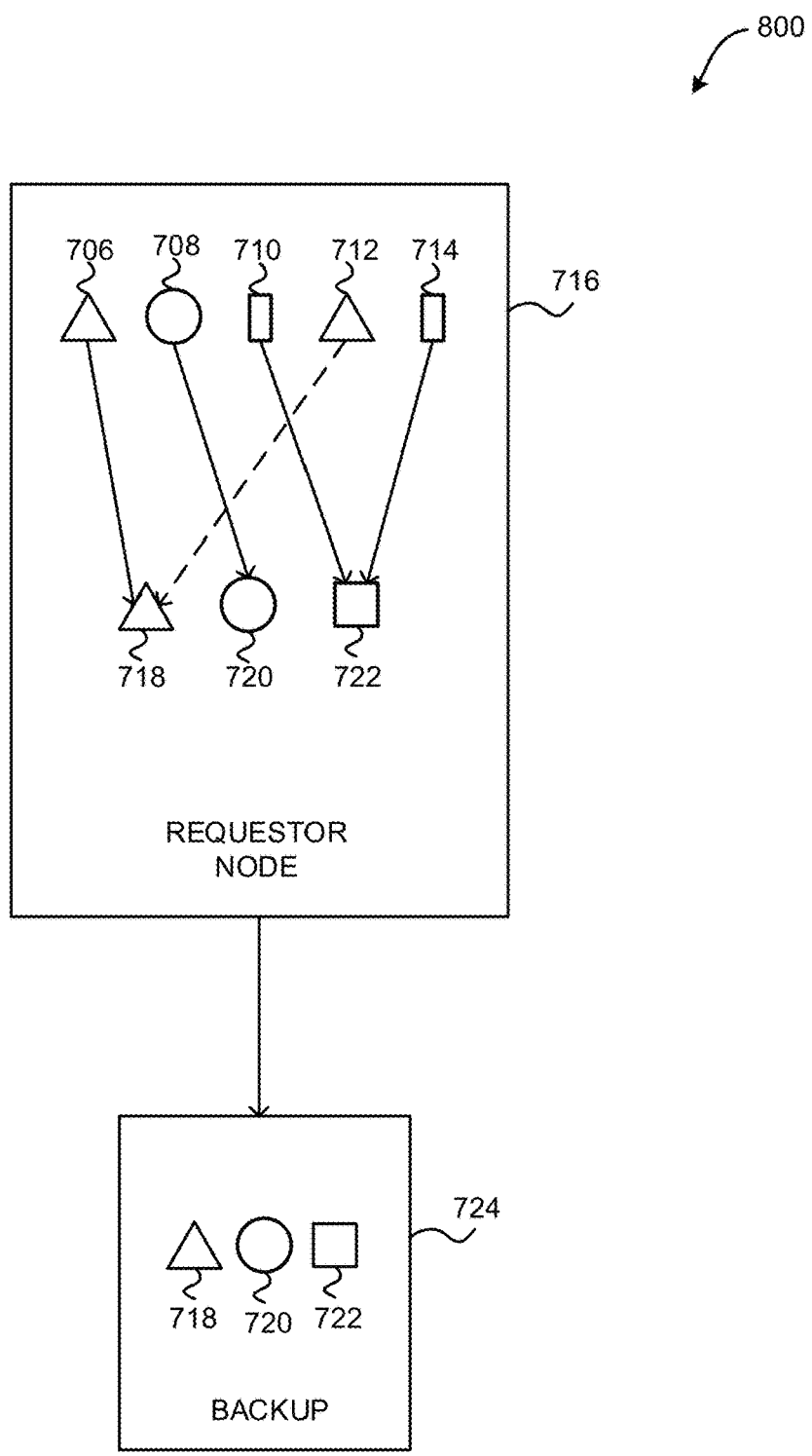
FIG. 8 illustrates an exemplary merging of retrieved fragments by the requestor node, in accordance with one embodiment.

FIG. 8 illustrates an exemplary merging 800 of retrieved fragments by the requestor node 716 and creation of a backup archive 724, according to one embodiment. As shown, the requestor node 716 determines a first consistent state fragment 718, utilizing the first copy 706 of the first state fragment and the second copy 712 of the first state fragment. For example, the requestor node may identify a version number of the first copy 706 of the first state fragment and compare it to a version number of the second copy 712 of the first state fragment. In one embodiment, whichever copy has the most recent version number may be used to create the first consistent state fragment 718 by the requestor node 716. In another embodiment, the first consistent state fragment 718, the second consistent state fragment 720, and the third consistent state fragment 722 may combine to create a complete set of consistent state data.

Additionally, since there are no possibly conflicting copies of the second state fragment 708, the second state fragment 708 is used to create the second consistent state fragment 720 by the requestor node 716. Further, the first portion 710 of the third state fragment and the second portion 714 of the third state fragment are combined to create the third consistent state fragment 722 by the requestor node 716.

Further still, the backup archive 724 is created by the requestor node 716, utilizing the first consistent state fragment 718, the second consistent state fragment 720, and the third consistent state fragment 722.

Figure 9:
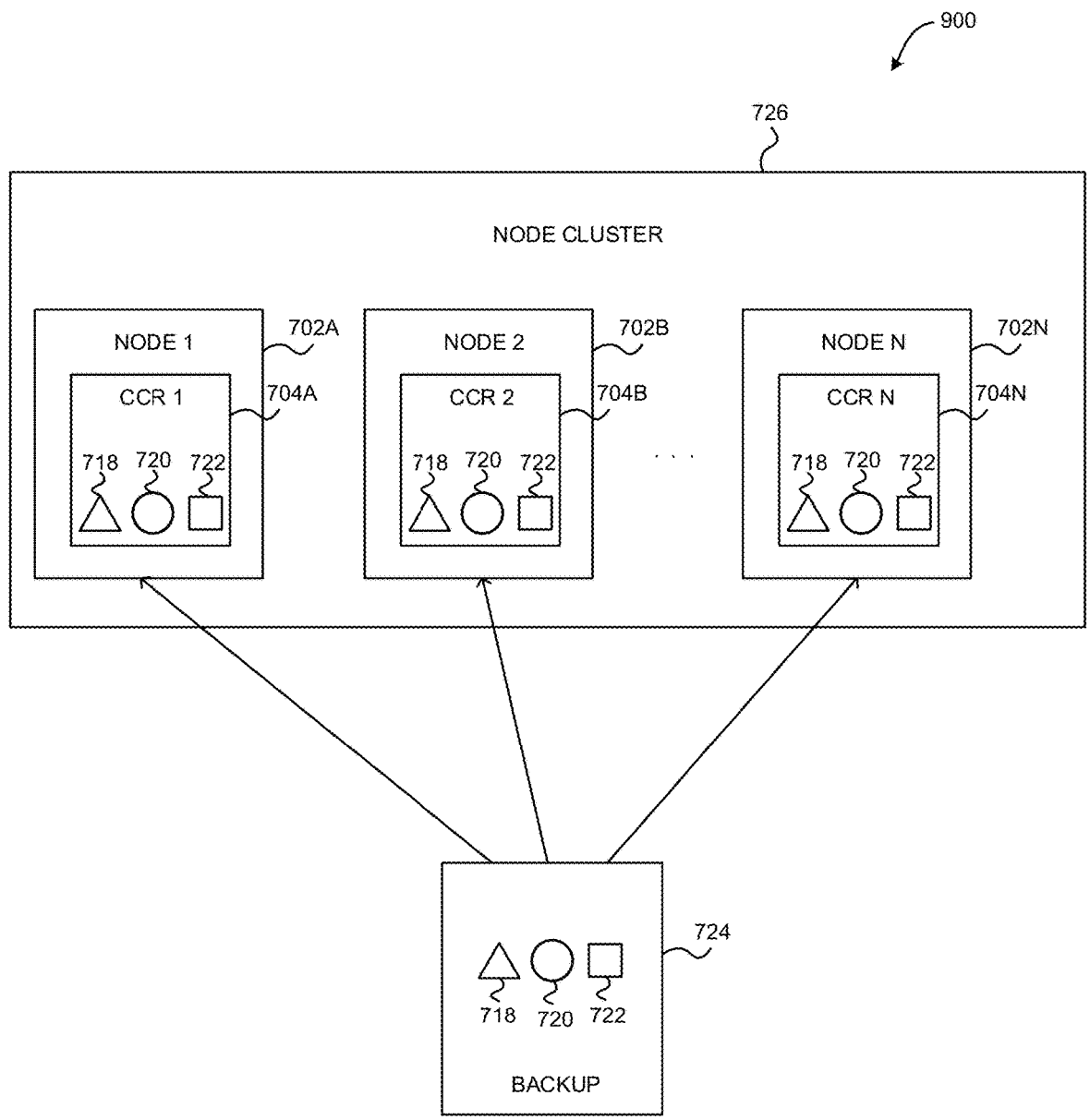
FIG. 9 illustrates an exemplary implementation of a backup archive, in accordance with one embodiment.

FIG. 9 illustrates an exemplary implementation 900 of a backup archive 724, according to one embodiment. As shown, the first consistent state fragment 718, the second consistent state fragment 720, and the third consistent state fragment 722 may be sent from the backup archive 724 to replace all fragments within each CCR 704A-N of the server nodes 702A-N of the node cluster 726.

In this way, the backup archive 724 may be used to restore the CCRs 704A-N of the server nodes 702A-N. Each of the server nodes 702A-N may then have a complete set of consistent state data that is obtained from the backup archive 724.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    identifying one or more accessible server nodes within a plurality of nodes of a failed clustered system;
    retrieving a plurality of fragments of configuration data from the one or more accessible server nodes; and
    constructing a backup state for the failed clustered system, utilizing the plurality of fragments of the configuration data, including identifying a file list associated with a state having a highest sequence number of all sequence numbers within the one or more accessible server nodes, and comparing the file list to all files within the plurality of fragments of the configuration data retrieved from the one or more accessible server nodes.

2. The computer-implemented method of claim 1, further comprising restoring the failed clustered system, utilizing the backup state.

3. The computer-implemented method of claim 1, further comprising detecting the failed clustered system, including detecting a loss of a predetermined number of the plurality of nodes of the failed clustered system due to inaccessibility or corruption.

4. The computer-implemented method of claim 1, wherein the configuration data includes state information describing a state of the failed clustered system.

5. The computer-implemented method of claim 1, wherein the configuration data includes key-value pairs, internal data, a file list, and configuration files.

6. The computer-implemented method of claim 1, wherein the configuration data includes metadata describing each file stored within the one or more accessible server nodes, where the metadata is selected from a group consisting of: a file ID, an update ID, a version number, and a cyclic redundancy check (CRC).

7. The computer-implemented method of claim 1, wherein the backup state includes a set of the configuration data that is reconstructed utilizing the plurality of fragments of the configuration data.

8. The computer-implemented method of claim 1, wherein constructing the backup state includes merging the plurality of fragments of the configuration data to form the backup state.

9. The computer-implemented method of claim 1, wherein constructing the backup state includes determining that one or more of the plurality of fragments of the configuration data are associated with states having different sequence numbers, and using configuration data associated with a state having a highest sequence number of the different sequence numbers, in response to the determining.

10. A computer program product for recovering a failed clustered system, the computer program product comprising a computer readable storage medium having program instructions embodied therewith, wherein the computer readable storage medium is not a transitory signal per se, the program instructions executable by a processor to cause the processor to perform a method comprising:
    identifying one or more accessible server nodes within a plurality of nodes of a failed clustered system, utilizing the processor;
    retrieving a plurality of fragments of configuration data from the one or more accessible server nodes, utilizing the processor; and
    constructing, utilizing the processor, a backup state for the failed clustered system, utilizing the plurality of fragments of the configuration data, including identifying a file list associated with a state having a highest sequence number of all sequence numbers within the one or more accessible server nodes, and comparing the file list to all files within the plurality of fragments of the configuration data retrieved from the one or more accessible server nodes.

11. The computer program product of claim 10, further comprising restoring the failed clustered system, utilizing the backup state.

12. The computer program product of claim 10, further comprising detecting the failed clustered system, including detecting a loss of a predetermined number of the plurality of nodes of the failed clustered system due to inaccessibility or corruption.

13. The computer program product of claim 10, wherein the configuration data includes state information describing a state of the failed clustered system.

14. The computer program product of claim 10, wherein the configuration data includes key-value pairs, internal data, a file list, and configuration files.

15. The computer program product of claim 10, wherein the configuration data includes metadata describing each file stored within the one or more accessible server nodes, where the metadata is selected from a group consisting of: a file ID, an update ID, a version number, and a cyclic redundancy check (CRC).

16. The computer program product of claim 10, wherein the backup state includes a set of the configuration data that is reconstructed utilizing the plurality of fragments of the configuration data.

17. The computer program product of claim 10, wherein constructing the backup state includes merging the plurality of fragments of the configuration data to form the backup state.

18. The computer program product of claim 10, wherein constructing the backup state includes determining that one or more of the plurality of fragments of the configuration data are associated with states having different sequence numbers, and using configuration data associated with a state having a highest sequence number of the different sequence numbers, in response to the determining.

19. A system, comprising:
a processor; and
logic integrated with the processor, executable by the processor, or integrated with and executable by the processor, the logic being configured to:
identify one or more accessible server nodes within a plurality of nodes of a failed clustered system;
retrieve a plurality of fragments of configuration data from the one or more accessible server nodes; and
construct a backup state for the failed clustered system, utilizing the plurality of fragments of the configuration data, including identifying a file list associated with a state having a highest sequence number of all sequence numbers within the one or more accessible server nodes, and comparing the file list to all files within the plurality of fragments of the configuration data retrieved from the one or more accessible server nodes.

* * * * *